Nov. 9, 1948.    M. E. BROWN ET AL    2,453,301
MULTIPLE AND INDIVIDUAL SHUTTER RELEASES
FOR POWER-DRIVEN MOTION-PICTURE CAMERAS
Filed Jan. 8, 1948
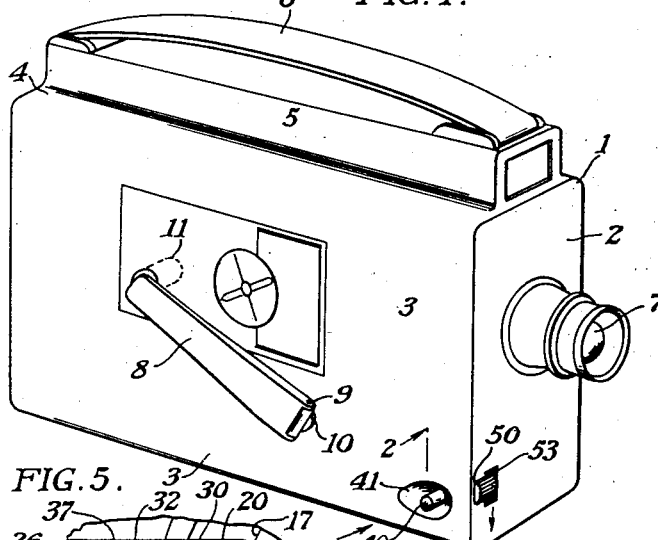
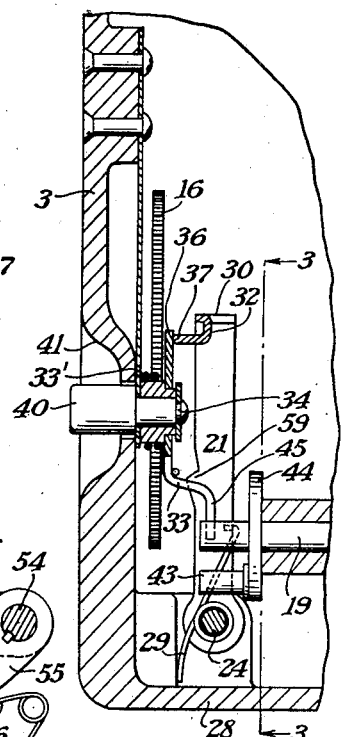
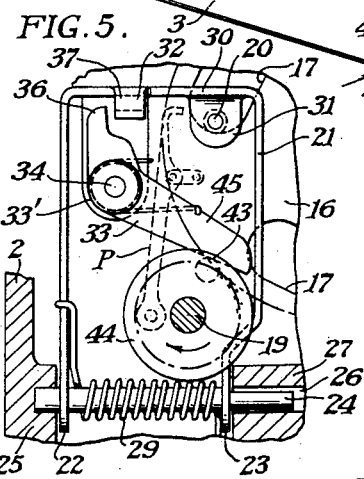
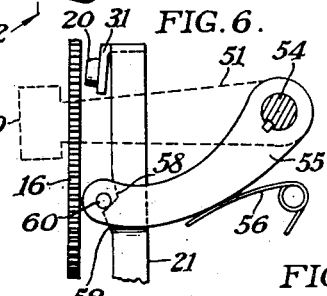
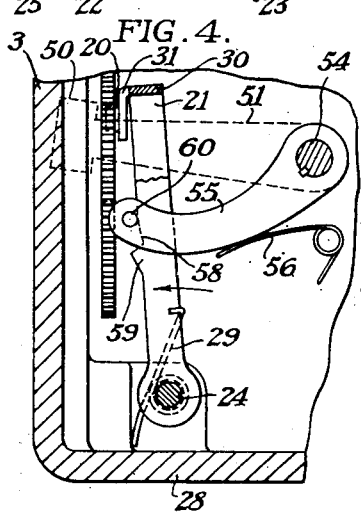
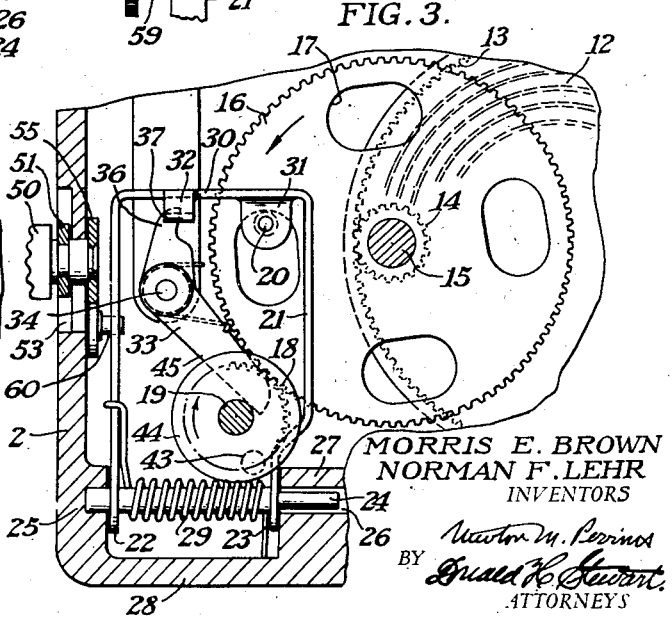
MORRIS E. BROWN
NORMAN F. LEHR
INVENTORS
BY
ATTORNEYS Patented Nov. 9, 1948

2,453,301

UNITED STATES PATENT OFFICE 2,453,301

MULTIPLE AND INDIVIDUAL SHUTTER RELEASES FOR POWER-DRIVEN MOTION-PICTURE CAMERAS

Morris E. Brown and Norman F. Lehr, Rochester, N. Y., assignors to Eastman Kodak Company, Rochester, N. Y., a corporation of New Jersey Application January 8, 1948, Serial No. 1,210

6 Claims. (Cl. 88—17)

1

This invention relates to photography and more particularly to shutter releases applied to a power-driven motion-picture camera, so that multiple or individual exposures can be made. One object of our invention is to provide a motion-picture camera with separate release members preferably arranged on separate camera walls, either of which may be manually moved to produce exposures; one for producing multiple exposures and the other for producing single exposures. Another object of our invention is to provide a simple form of mechanism through which the triggers may operate on a power-operated mechanism. Another object of our invention is to provide releases so constructed and arranged that there is very little liability of operating one of the releases inadvertently. Another object of our invention is to provide a single latch mechanism cooperating with the power-operated mechanism with which said latch can function in different ways according to the release which is manually operated. Other objects will appear from the following specification, the novel features being particularly pointed out in the claims at the end thereof.

In power-operated motion-picture cameras, such as moiton-picture cameras operated by a spring, a release member is usually provided for releasing the mechanism to produce multiple exposures for motion pictures. Some cameras are equipped with a means for releasing the mechanism so as to move only a single step, or cycle, to produce a single picture. In most instances these mechanisms are operated by providing some type of shifting mechanism and all of the release operations, both for multiple pictures and individual pictures, are made with a single release. There are, however, a few motion-picture camera mechanisms which are equipped with two triggers. This reduces the liability of forgetting to set a shifting mechanism and thus operating the camera improperly as can readily occur where only one trigger is used. It is to this latter type of apparatus that our present invention is directed and our structure may be said to be an improvement over the camera release structure shown in U. S. Pat. No. 1,295,081, granted February 18, 1919. Our improvement over this patent, and other patents in the prior art, is directed to simplifying the mecha-

2 nism, insuring the proper operation of the single release mechanism, and arranging the release structure so as to reduce the liability of error in using the release members.

Coming now to the drawings wherein like reference characters denote like parts throughout:

Fig. 1 is a perspective view of a typical power-operated motion-picture camera equipped with releasing mechanisms constructed in accordance with and embodying a preferred form of our invention;

Fig. 2 is an enlarged section taken on line 2—2 of Fig. 1, certain parts being omitted to better illustrate our invention;

Fig. 3 is an enlarged fragmentary section showing certain parts in elevation and omitting certain non-essential parts taken parallel to the objective axis through a portion of the camera shown in Fig. 1;

Fig. 4 is a fragmentary enlarged sectional view through the side wall illustrating the shutter release used for making motion pictures;

Fig. 5 is an enlarged fragmentary view partially in section and partially in elevation showing a portion of the single picture release mechanism; and Fig. 6 is a fragmentary view showing some of the parts shown in Fig. 4 but in a different or picture-taking position.

Our invention briefly may be described as a pair of shutter triggers mounted on different walls of the camera for operating a single latch mechanism which holds the power-operated, shutter-driving mechanism against movement so that the latch may be released for making either a continuous burst of pictures or a single picture at each actuation of the shutter. In the case of the motion-picture shutter release this may be held down against spring pressure while the mechanism operates so that by holding the trigger manually, pictures will be made and, so that by releasing the trigger, it will be restored to a normal position by means of a spring in which position the latch will stop the movement of the camera mechanism. The single picture release may be depressed to allow the mechanism to move a single cycle to make a single exposure and only a single exposure will be made whether the release is depressed and immediately released, or, whether the release is held in its depressed position. With the first-mentioned shutter release for producing motion pictures, if it is desirable to latch the release downwardly, this may be done by moving the release to the full extent of its downward movement, in which case it is latched down and the camera will continue to run until the release is manually moved upwardly to release the latch and permit the release spring to raise the lever. Such a structure is of use if the operator desires to get in the picture.

More specifically, our invention may be applied to a standard type of motion-picture camera indicated broadly as 1, this camera preferably having a front wall 2, a side wall 3 and a top wall 4 on which a known type of finder 5 and handle 6 may be carried. The front wall 2 may carry the usual objective 7 and the side wall 3 may carry a handle 8 hinged at 9 to shaft 10 which may be turned when the handle 11 is swung outwardly and into an operative position to tension the camera spring 12 shown in Fig. 3. As thus far described, the camera may be of any known type.

The spring 12 tends to move an internal gear 13 meshing with a pinion 14 carried on a shaft 15 which also turns the gear 16 in the direction shown by the arrow in Fig. 3. This gear may be connected to a notched or apertured disk, although the gear itself may be notched by providing the openings 17. In the present instance, four of these openings are provided since this gear turns once to four revolutions of the pinion 18 which is mounted on a shaft 19. Shaft 19 drives any standard form of pull-down mechanism "P," Fig. 5, and at each revolution of the shaft 19, the pull-down moves once to make a single exposure when a shutter, not shown, crosses a light beam axial with the lens 7.

The notches or apertures 17 form latch elements, any one of which may be engaged by a protuberance 20 which constitutes a movable latch element and which is carried by a light metal U-shaped frame 21. This frame, as best shown in Figs. 3 and 5, has a pair of depending arms 22 and 23 which engage a shaft 24 which is fixedly mounted in a boss 25 carried by the front wall 2 of the camera and which has a loose fit with the aperature 26 carried by a boss 27 on the bottom wall 28 of the camera. A spring 29 encircles the shaft and normally turns the frame 21 in the direction shown by the arrow in Fig. 4; that is, in a direction to engage the stop disk or gear 16. Figs. 3 and 4 show the frame in its operative or latching position with the protuberance 20 engaging a notch 17 and Fig. 6 shows the protuberance or latch member 20 swung from this position, permitting the stop disk 16 to turn and permitting the spring 12 to operate the pull-down and shutter mechanism in a known manner.

The frame 21 on its upper cross member 30 carries two lugs; a lug 31 which supports the protuberance 20 and a lug 32 which is adapted to be engaged by a lever 33 pivotally mounted on a pin 34 and normally held by a spring 33' with the arm 36 resting against the side flange 37 of protuberance 32, as best shown in Fig. 2. It will be noticed that this flange 37 is comparatively long and it will be normally engaged by the arm 36, except when the single release trigger has been depressed as will be now described. Referring to Figs. 1 and 2, the single release trigger 40 may lie in a recess 41 in the side wall 3 of the camera to project therefrom only a minimum distance as indicated in Fig. 2. When the trigger is depressed, the arm 33 hingedly carried by the pin may engage the end of the flange 37, as in Figs. 2 and 3, and inward pressure upon the button 40 will move the hinged frame 21 against the pressure of its spring 29 until the protuberance 20 or latch member releases a notch 17 in the notched disk 16. The spring mechanism therefore will operate the camera and the pull-down shaft 19 will be driven one revolution because arm 36 will be released from lug 32 before a second revolution can occur. This is accomplished by means of an eccentric pin 43 carried by a disk 44 keyed to the shaft 19, as shown in Figs. 3 and 5. Fig. 3 shows the position of the parts as the latch is released and it will be noticed that the pin 43 swings in the direction shown by the arrow and into engagement with the arm 45 of lever 33 before one revolution of gear 18 can take place. Therefore, as indicated in Fig. 5, the arm 36 is swung away from the lug 32 immediately releasing the frame 21 so that the protuberance 20 drops down against the notched disk 16 so that it will enter the advancing notch 17 in the notched disk 16 and so that it will stop the movement of this disk as soon as it reaches the end of the notch. Fig. 5 shows the protuberance 20 just dropping into the notch 17 and the notched disk 16 may continue to turn until the opposite end of the notch or aperture is reached. If the rapidly turning notched disk 16 struck a perfectly rigid protuberance 20, there would be considerable shock to the mechanism and, in order to avoid this, the arm 23 of the frame 21 is positioned adjacent the loose fit between the shaft 24 and its aperture 26 so that the entire frame and the outer end of shaft 24 may move a limited distance to cushion the shock of the parts suddenly stopping. There is a natural spring in the shaft 24 which causes the shaft to move up against its loose bearing 26 when the latch element stops the notched disk, and the frame 21 is preferably made of thin metal which may also spring to assist in taking up the shock; the spring 29 also tending to hold the shaft 24 in its normal position of rest shown in Fig. 3. Thus, each time the release 40 is depressed, a single exposure can be made and it is unimportant whether the operator immediately releases the latch 40 or whether he holds it down, because the mechanism itself trips the lever 33 which holds the latching frame out of its latching position and the frame will return to its latching position after a predetermined travel of the pull-down shaft 19, so that this shaft will make only a single revolution each time the trigger 40 is depressed.

There is a second trigger 50 which is used for continuous exposures or motion pictures. This release 50 is mounted on the front wall 2 of the camera and it includes a handle member with an arm 51 passing downwardly and into the camera through a slot 53 in the front wall 2. As shown in Fig. 6, the arm 51 extends rearwardly to a shaft 54 on which it is mounted and on which a release arm 55 is likewise mounted, both of these arms turning together. A spring 56 normally holds the trigger 50 in its raised position, as shown in Fig. 1. The frame 21 is provided with a formation on one of its arms 57, as best shown in Fig. 6. There is an inwardly curved portion 58 and an outward protuberance 59 on the side of this arm facing the camera front wall 2. Arm 55 carries a pin 60 which is so positioned relative to shaft 54 that when in its rest position of Fig. 4, the latch 20 may engage a notch 17 in the notched disk 16 to hold the power drive in a stationary position. However, when the trigger 50 is moved downwardly from its Fig. 4 position to its Fig. 6 position, the pin 60 cams the frame 21 about its shaft 24 away from the notched disk, permitting the camera drive to operate. It will continue to operate as long as the operator holds the trigger 50 downwardly but should the release 50 be released, the spring 56 will move it to its Fig. 4 position in which the latch 20 may engage the next stop notch 17 of the stop disk 16.

It is sometimes desirable to latch the release in its releasing position rather than to manually hold it in its releasing position. Where this is necessary, the release 50, which normally comes to a stop on the lug 59, may be depressed still further downwardly until the pin 60 rides over the hump 59 in which position the trigger will be held latched downwardly until it is manually raised past the projection 59. Since this trigger latching is not normally used, it requires an added effort to ride over the projection 59 since the frame 21 must be moved rearwardly against its spring 29 before its latched position can be reached.

In operation, if a single frame picture is desired, the release 40 may be pressed inwardly moving the frame 21 rearwardly to its released position through the arm 36 lying beneath lug 32 as the motor drive shaft 19 turns and pin 43 engages arm 45, swinging arm 36 from beneath the lug 32, as indicated in Fig. 5. The frame 21 then snaps over toward and against the stop disk 16 so that the latch 20 will engage the next successive aperture 17 in the stop disk 16. The lever 33 will, of course, be released as the shaft 19 continues to turn, so that the arm 33 will swing under the influence of its spring 33' against a stop lug 33a and beneath the end of the projection 37. The length of the lug 37 is such that arm 36 will be held away from its Fig. 3 position as long as the trigger 41 is depressed but when the trigger returns to its rest position, as shown in Fig. 2, the spring 33' may return the lever arm 33 to its Fig. 3 position.

If the operator should desire to expose a length of film, the trigger 50 may be depressed. Pin 60 will cam lever 21 from its latching position and the shutter mechanism may continue to run until the trigger 50 is released, at which time the spring 56 will return it to its normal rest position. However, if a series of pictures are to be made in which the operator wishes to get in the picture, or in which he desires to latch the lever 50 in a running position, he may apply some pressure to the trigger 50 as it comes against the projection 59 to force the pin 60 past the projection in which position the lever spring 56 cannot return the trigger 50 to its rest position until the trigger is manually moved past the projection 59.

With our improved form of release mechanism, the two triggers are arranged on separate walls of the camera where they will not likely be mistaken, one for the other. The triggers operate in a different manner. A push button for single releases and a swinging lever for continuous release and the mechanisms both operate on a single latch member which in itself is provided with a cushioning means to soften the shock which would otherwise occur when the power-driven mechanism is brought to a sudden stop. The single picture release is arranged so that the power-drive mechanism itself immediately releases the camera mechanism latch after the trigger is depressed, so that it is impossible to operate the trigger 40 in such a manner that more than one picture would be taken unless the cycle is completed and the trigger is again depressed. This reduces the liability of improper operation of the shutter release mechanism.

Having now described our invention, what we desire to secure by Letters Patent of the United States and what we claim is:

1. A power-operated motion-picture camera releasing mechanism for cameras of the type including a source of power, a pull-down mechanism driven thereby, and gearing connecting the power drive and pull-down mechanism, said releasing mechanism including a pair of triggers, one of said triggers for individual exposures and the other of said triggers for multiple exposures, a notched disk movable with the gearing, a spring-actuated latch element normally engaging the notched disk for preventing movement of the power drive, one of said triggers directly engaging and moving the latch against spring pressure into an inoperative position so the motor may drive the pull-down; the other of the triggers including a pivoted member normally engageable with the latch element to move the same when the trigger is moved, and means actuated by the gearing for moving the pivoted element to release the latch after predetermined movement of the gearing.

2. A power-operated camera releasing mechanism as defined in claim 1 characterized by the interengaging parts of the first-mentioned trigger which directly engages and moves the latch against spring pressure having two positions, in one position of which a lug on the latch holds the trigger in position for the power drive to function until the trigger is manually released.

3. A power-operated camera releasing mechanism as defined in claim 1 characterized by the latch including a spring shock absorber on which the latch may move as it moves under the influence of its spring into engagement with the notched disk.

4. A power-operated camera releasing mechanism as defined in claim 1 characterized by the latch including a spring shock absorber on which the latch may move as it moves under the influence of its spring into engagement with the notched disk, said spring shock absorber comprising a spring pin anchored at one end and free at the other end on which the latch is pivotally mounted.

5. A power-operated motion-picture camera releasing mechanism for cameras of the type including a source of power, a pull-down mechanism driven thereby, and gearing connecting the power drive and pull-down mechanism, said releasing mechanism including a pair of triggers, one of said triggers for individual exposures and the other of said triggers for multiple exposures, a notched disk movable with the gearing, a spring-actuated latch element normally engaging the notched disk for preventing movement of the power drive, one of said triggers directly engaging and moving the latch against spring pressure into an inoperative position so the motor may drive the pull-down, the other of the triggers including a pivoted member normally engageable with the latch element to move the same when the trigger is moved, said pivoted element comprising a lever having an arm extending adjacent the pull-down shaft, and a pin carried by the pull-down shaft positioned to engage and move the lever arm and release the latch whereby the latch may stop the power drive.

6. A power-operated motion-picture camera releasing mechanism for cameras of the type including a source of power, a pull-down mechanism driven thereby, and gearing connecting the power drive and pull-down mechanism, said releasing mechanism including a pair of triggers, one of said triggers for individual exposures and the other of said triggers for multiple exposures, a notched disk movable with the gearing, a spring-actuated latch element normally engaging the notched disk for preventing movement of the power drive, said spring-actuated latch element comprising a frame member having spaced arms, a pivot pin mounted on a camera wall and engaging the spaced arms to hingedly mount the frame, a protuberance carried by the frame opposite the arms constituting the notched disk engaging member, and a resilient connection between said protuberance and the camera wall carrying the pivot pin for cushioning the blow of the notched disk coming to rest against the protuberance, said trigger for multiple exposures holding the latch from the notch wheel when operated and said trigger for individual pictures including means for releasing said latch after a single pull-down operation.

MORRIS E. BROWN.
NORMAN F. LEHR.

No references cited.